(12) United States Patent
Morris et al.

(10) Patent No.: US 8,151,394 B2
(45) Date of Patent: *Apr. 10, 2012

(54) PIPELINE SYSTEMS USING A REVERSE FLOW WYE CONNECTOR

(75) Inventors: Bruce E. Morris, Houston, TX (US); Kenneth Breaux, Houston, TX (US)

(73) Assignee: Quality Connector Systems, Houston, TX (US)

( * ) Notice: Subject to any disclaimer, the term of this patent is extended or adjusted under 35 U.S.C. 154(b) by 1211 days.

This patent is subject to a terminal disclaimer.

(21) Appl. No.: 11/857,972

(22) Filed: Sep. 19, 2007

(65) Prior Publication Data

US 2008/0263796 A1 Oct. 30, 2008

Related U.S. Application Data

(63) Continuation-in-part of application No. 11/796,122, filed on Apr. 26, 2007, now Pat. No. 7,891,377.

(51) Int. Cl.
B08B 9/04 (2006.01)
(52) U.S. Cl. .................................. 15/3.51; 15/104.062
(58) Field of Classification Search ............... 15/104.61, 15/104.62, 3.5, 3.51; 137/15.01–15.26
See application file for complete search history.

(56) References Cited

U.S. PATENT DOCUMENTS

| | | | |
|---|---|---|---|
| 1,753,989 A | 4/1930 | Wilhelm | |
| 1,767,658 A | 6/1930 | Fantz | |
| 3,139,932 A * | 7/1964 | Johnson | 166/368 |
| 3,186,014 A | 6/1965 | Herbert | |
| 3,545,489 A | 12/1970 | Brown et al. | |
| 3,664,376 A * | 5/1972 | Watkins | 137/625.68 |
| 3,674,123 A | 7/1972 | Lewis et al. | |
| 4,224,986 A | 9/1980 | Rothberg | |
| 4,291,724 A | 9/1981 | Miller | |
| 4,372,337 A | 2/1983 | Holzenberger | |
| 4,411,459 A | 10/1983 | Ver Nooy | |
| 4,821,772 A | 4/1989 | Anderson et al. | |
| 4,964,612 A | 10/1990 | Maggioni et al. | |
| 4,971,307 A | 11/1990 | Killerud et al. | |
| 5,076,319 A | 12/1991 | Salley | |
| 5,307,838 A | 5/1994 | d'Agostino et al. | |
| 5,842,816 A * | 12/1998 | Cunningham | 405/170 |
| 5,857,715 A | 1/1999 | Gray et al. | |
| 5,893,392 A | 4/1999 | Spies et al. | |
| 6,142,708 A | 11/2000 | Tarlton et al. | |
| 6,311,727 B1 | 11/2001 | Campau | |
| 6,851,478 B2 * | 2/2005 | Cornelssen et al. | 166/368 |

* cited by examiner

*Primary Examiner* — Dung Van Nguyen
(74) *Attorney, Agent, or Firm* — Meyertons, Hood, Kivlin, Kowert & Goetzel, P.C.; Eric B. Meyertons

(57) ABSTRACT

A piggable pipeline system is disclosed. One or more pig launcher/receivers may be coupled to a pipeline. At least one fitting may be coupled to the pipeline. The fitting may include a body and at least two passages through the body. The passages are in fluid communication within the body. A diverter is located in at least one of the passages. The diverter is movable between an open position and a closed position. In the open position, the diverter allows open flow between two of the passages. In the closed position, the diverter inhibits flow between the two passages. The pipeline may allow a pig to be launched from at least one of the pig launcher/receivers and returned through the pipeline to at least one of the pig launcher/receivers.

23 Claims, 8 Drawing Sheets

PIPELINE SYSTEMS USING A REVERSE FLOW WYE CONNECTOR

PRIORITY CLAIM

This patent application is a continuation-in-part of U.S. patent application Ser. No. 11/796,122 entitled "REVERSE FLOW WYE CONNECTOR" to Morris filed on Apr. 26, 2007.

BACKGROUND

1. Field of the Invention

The present invention relates to subsea pipelines and connectors and/or fittings used in the pipelines. Some embodiments relate to fittings to combine and/or redirect flow in the pipelines. More particularly, the invention relates to a pipeline using the fitting to facilitate pigging and/or cleaning of pipelines.

2. Description of Related Art

Pipeline systems (e.g., subsea pipeline systems) are a maze of connected and interconnected pipeline segments that transport hydrocarbons or related products from one point to another. The pipeline connection points initiate at the wellhead or other sources (e.g., refineries, plants, vessels, or production vessels) and connect to manifolds, offshore structures, onshore facilities, intermediate processors, and, eventually, to final processing and distribution of the products. Due to the expenses and flow issues of running dedicated pipelines from the initiating point direct to processing stations, shorter pipeline segments are joined to existing or larger pipelines to create the product pipeline from the source (e.g., the initiating wellhead) to the market (e.g., onshore stations).

Pipeline interconnects have been accommodated by placing tee-shaped fittings with a perpendicular intersect into a pipeline to create what has been known as a branch or lateral connection point. These connections provide a means of combining the product from one line with another. However, these connect ions do not allow or the passage of certain pigs used for cleaning and inspection, sometimes referred to as solid-mandrel, trained, or intelligent pigs. Combining the flow of two pipelines into one line to allow for pigging by all common forms of pigs requires the use of a fitting known as a piggable wye.

Piggable wye fittings have relatively shallow intersect angles, typically about 30° or less, which allow for fairly smooth transmission of long pigs and pig trains from either of the two inlet bores through the intersect and out through a common exhaust. However, if a pig is ever run into the piggable wye in a reverse direction, the pig will jam in the intersect of the wye, abnormally shutting down the pipeline.

Reverse flow of a pipeline is becoming increasingly more common. To this end, the ability to pig in the reverse flow direction is becoming a more common consideration for pipeline design. Thus, a piggable wye fitting that can be configured to suitably pass all forms of pigs in normal (e.g., combining) flow conditions and in reverse (e.g., directed) flow conditions is desirable.

The layout of a field development or pipeline system in which production from a subsea well flows through a subsea pipeline, or flowline, to a host platform may be referred to as a tie-back or subsea tie-back. When certain physical and chemical conditions are anticipated to exist in the production stream that will be transported in the tie-back flowline, two pipelines have been installed to join the subsea well with the host platform to form a pigging loop.

The ability to pig a subsea tie-back may be needed to effectively send or launch a pig from the host platform via the first pipeline to the subsea well or to the proximity of the well. The pig may be propelled back to the host platform via the second pipeline. Such a pigging operation allows the operator to help keep the pipeline system clear of debris and or harmful matter as well as allow the operator to perform other operational, inspection, and maintenance procedures.

Having a tie-back pipeline configured in a pigging loop has typically required the installation of two pipeline runs from the host platform to the subsea wellhead or in near proximity to the wellhead. Both of these pipelines may require risers or lengths of pipe routed from the sea floor to the host platform. On the host platform, each of the pipelines is typically configured with a pig launcher and/or a pig receiver. Such a host platform must be designed with enough physical space to allow placement of the required pipe runs and pig launchers/receivers for both pipelines.

In addition to the physical space required on the host platform needed to accommodate the pipe runs and pig launcher/receivers, the host platform must be designed with enough load carrying capacity to support the two pipeline or flowline risers. If the host platform is a floating structure, this additional load carrying capacity may be accommodated by designing and building the host platform with additional buoyancy. If the host platform is a template structure bearing its load on the seafloor, the structure must be designed with appropriately sized deck beams and supporting members as well as larger and adequately braced platform legs. Such host platforms may be costly to manufacture, install, and/or maintain. Thus, piggable pipelines that reduce the load carrying capacity and physical space required on the host platforms are desirable. In certain embodiments, a single pipeline pigging loop (e.g., a pipeline loop that allows the pig to be propelled back to the host platform in the same pipeline) may reduce the load carrying capacity and physical space required on the host platform.

In some situations, the pipeline system may have more than one pipeline branch that requires pigging. Certain pigs may not be usable in such pipeline systems. For example, the pigs may not be able to negotiate a "T" fitting that connects the pipeline branches. A separate pig launcher and receiver may be needed to pig each pipeline branch. Using multiple pig launchers and receivers results in expensive, voluminous, heavy launcher and receiver barrels, and their associated piping, to be installed for multiple pipeline branches. Thus, a pipeline system that allows the pig to be propelled through multiple branches from a single pig launcher/receiver is desirable.

SUMMARY

In certain embodiments, a subsea fitting includes a body with at least two passages through the body. The passages are in fluid communication within the body. A diverter may be located in at least one of the passages. The diverter may be movable between an open position and a closed position. In the open position, the diverter allows open flow between two of the passages. In the closed position, the diverter allows the passage of a pig in a specific passage in both directions.

In some embodiments, the two passages are oriented relative to each other such that at least one of the passages is piggable in the reverse direction. The two passages may be oriented with about a 30° angle between the passages. The two passages may be oriented symmetrically about a central axis.

In some embodiments, the diverter is coupled to the body using a flange. The diverter may include a tubular that fits snugly inside the passage, or have a non-interference fit with a gap between the diverter and the body, and is allowed to rotate inside the passage. The tubular may have an opening. In the open position, the opening allows open flow between the two passages. In the closed position, the opening is positioned so that open flow is inhibited between the two passages.

In some embodiment, the diverter includes orifices that allow at least some fluid flow between the two passages to equalize pressure between the two passages. The orifices inhibit object flow between the two passages.

In some embodiments, a drive hub moves the diverter between the open and closed positions. The drive hub may include teeth, castellations, or other features that engage the diverter so that the drive hub is able to move the diverter. A gear may be coupled to the drive hub to move the drive hub. The gear may include teeth that engage teeth on the drive hub so that the gear operates the drive hub. The coupling between the gear and the drive hub may be substantially sealed from external pressure. The gear may be operable using a remotely operated vehicle (ROV) or other tool. A torque bucket, a hand wheel, a motor, or other operator may be coupled to the gear.

In certain embodiments, a piggable pipeline system includes a pipeline. One or more pig launcher/receivers are coupled to the pipeline. At least one fitting is coupled to the pipeline. The fitting includes a body, at least two passages through the body, and a diverter. The passages are in fluid communication within the body. The diverter is located in at least one of the passages. The diverter may be movable between an open position and a closed position. In the open position, the diverter allows open flow between two of the passages. In the closed position, the diverter inhibits flow between the two passages. The pipeline may allow a pig to be launched from at least one of the pig launcher/receivers and returned through the pipeline to at least one of the pig launcher/receivers.

BRIEF DESCRIPTION OF THE DRAWINGS

Features and advantages of the methods and apparatus of the present invention will be more fully appreciated by reference to the following detailed description of presently preferred but nonetheless illustrative embodiments in accordance with the present invention when taken in conjunction with the accompanying drawings in which.

Figure 1:
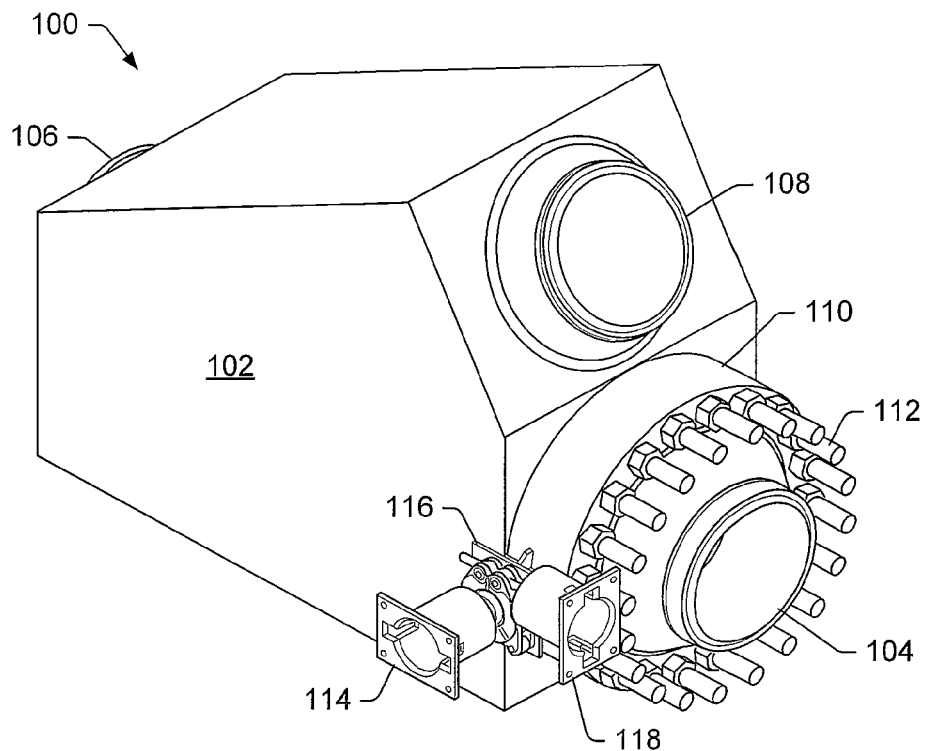
FIG. 1 depicts a perspective representation of an embodiment of a subsea fitting.

While the invention is susceptible to various modifications and alternative forms, specific embodiments thereof are shown by way of example in the drawings and will herein be described in detail. The drawings may not be to scale. It should be understood that the drawings and detailed description thereto are not intended to limit the invention to the particular form disclosed, but to the contrary, the intention is to cover all modifications, equivalents and alternatives falling within the spirit and scope of the present invention as defined by the appended claims.

DETAILED DESCRIPTION OF EMBODIMENTS

In the context of this patent, the term "fitting" means a fitting or connector that may be coupled into a pipeline (e.g., a subsea pipeline, slurry pipeline, or solid transport pipeline). The term "coupled" means either a direct connection or an indirect connection (e.g., one or more intervening connections) between one or more objects or components. The phrase "directly connected" means a direct connection between objects or components such that the objects or components are connected directly to each other so that the objects or components operate in a "point of use" manner. The term "open flow" means that flow is open to both fluid and objects through a passage.

Figure 2:
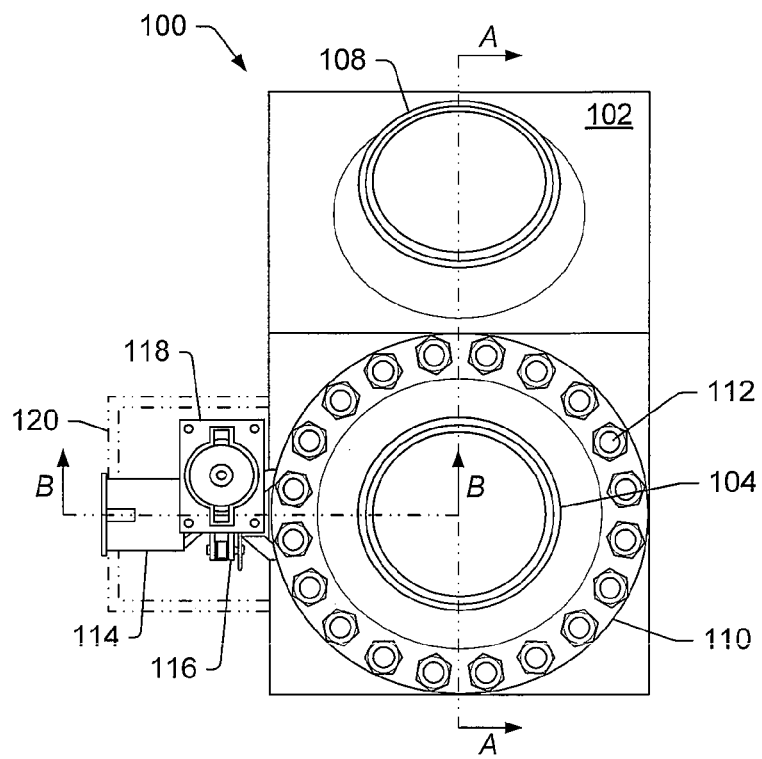
FIG. 2 depicts an end view of the subsea fitting depicted in FIG. 1.

FIG. 1 depicts a perspective representation of an embodiment of subsea fitting 100. FIG. 2 depicts an end view of fitting 100. Fitting 100 includes body 102. Body 102 may be made from materials such as, but not limited to, carbon steel, stainless steel, titanium, aluminum, plastic, or composite. In some embodiments, body 102 is a single piece forged, cast, formed, or molded from any of the above listed materials as well as other materials. In some embodiments, body 102 is constructed by welding fabrication of plates, tubes, and forged or cast parts. Fitting 100 and body 102 may be operable in high pressure conditions due to the pressurized contained product in the pipeline or ambient pressure from deep subsea conditions. For example, fitting 100 and body 102 may be configured to meet selected ASME (American Society of Mechanical Engineers) standards, ANSI (American National Standards Institute) ratings, ASTM (American Society for Testing and Materials) standards, and/or DNV (Det Norske Veritas) standards. In some embodiments, body 102 is coated with a material to increase the strength, weldability, and/or corrosion resistance of the body. For example, body 102 may be coated with an epoxy such as Carboline 890® epoxy (Carboline Company, St. Louis, Mo., USA).

In certain embodiments, fitting 100 is a wye-shaped fitting. Fitting 100 includes three ports 104, 106, and 108 on body 102. Ports 104, 106, and 108 may be at the ends of one or more passages in body 102 (e.g., the ports define the ends of the passages). Flanges may be coupled to one or more of the ports. In certain embodiments, flange 110 is coupled to port 104. Flange 110 may be coupled to port 104 using bolts 112 or other means such as welding, threads, or hubs that attach flange 110 to body 102 at port 104. In certain embodiments, ports 104, 106, and/or 108 allow fitting 100 to be coupled to one or more subsea pipelines and/or additional fittings. In some embodiments, ports 104, 106, and/or 108 are coupled to one or more subsea pipelines and/or additional fittings using methods known in the art (e.g., welding). For example, pipe or connector flanges may be welded to ports 104, 106, and/or 108 on fitting 100. In some embodiments, flange 110 and/or other flanges allow fitting 100 to be coupled to one or more subsea pipelines and/or additional fittings at ports 104, 106, and/or 108.

In certain embodiments, bucket 114 is coupled to flange 110. Bucket 114 may be coupled to flange 110 using connector 116. In some embodiments, connector 116 is coupled to bucket 118. In some embodiments, as shown in FIG. 2, covering 120 may enclose at least a portion of bucket 114, connector 116, and/or bucket 118. Covering 120 may at least partially protect bucket 114, connector 116, and/or bucket 118. For example, covering 120 may protect bucket 114, connector 116, and/or bucket 118 from being accidentally hit by objects in and around fitting 100 (e.g., a robotic arm, a digging tool, or other subsea tool).

Figure 3:
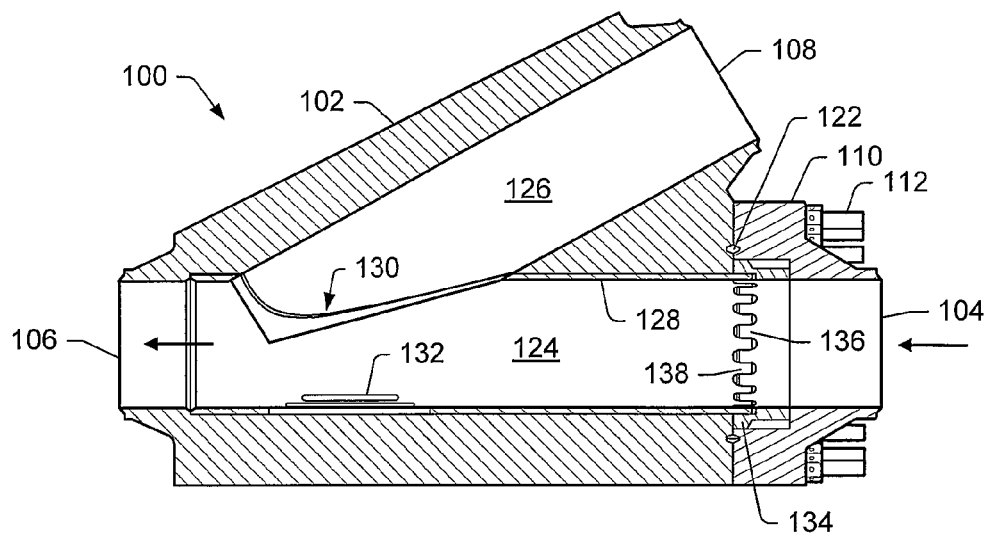
FIG. 3 depicts a cross-sectional representation of the fitting depicted in FIGS. 1 and 2 with a diverter in the fitting in an "open" position.
Figure 4:
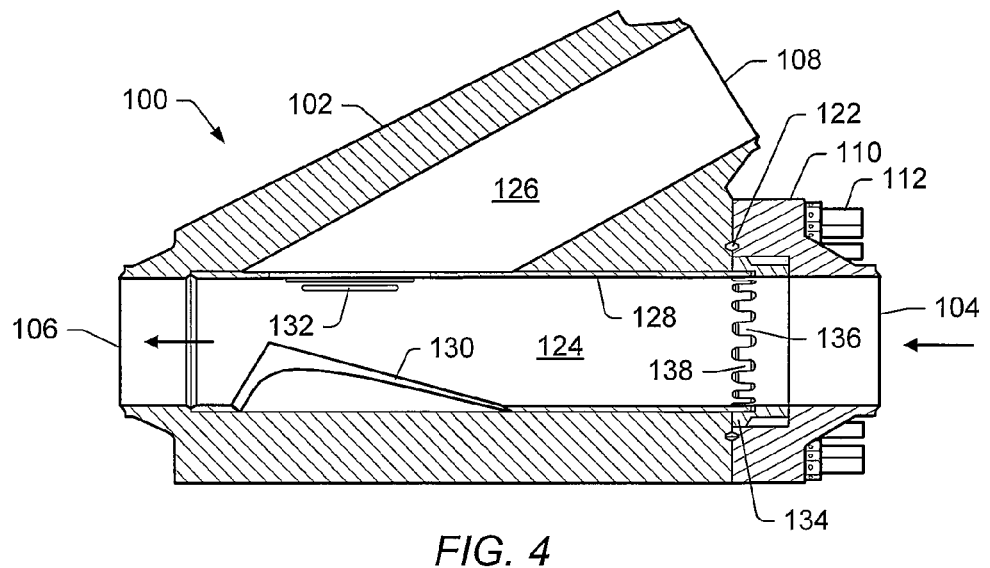
FIG. 4 depicts a cross-sectional representation of the fitting depicted in FIGS. 1 and 2 with the diverter in the fitting in a "closed" position.

FIGS. 3 and 4 depict cross-sectional representations of fitting 100 substantially along line A-A shown in FIG. 2. Passages 124 and 126 are in fluid communication with each other inside body 102. Passages 124 and 126 may be conduits through all or portions of body 102. In certain embodiments, passage 124 is a straight-through passage between port 104 and port 106. Passage 126 may branch off passage 124 to port 108 so that the passages are in a wye-shaped configuration. Passage 126 may branch off passage 124 at an angle that allows a pig to pass between the passages. In certain embodiments, passage 126 branches off passage 124 at an angle of about 30°. In some embodiments, passage 126 branches off passage 124 at an angle between about 0° and about 90°. In some embodiments, passage 126 branches off passage 124 at an angle in a range from about 10° to about 90°, in a range from about 20° to about 70°, or in a range from about 25° to about 60°.

Figure 9:
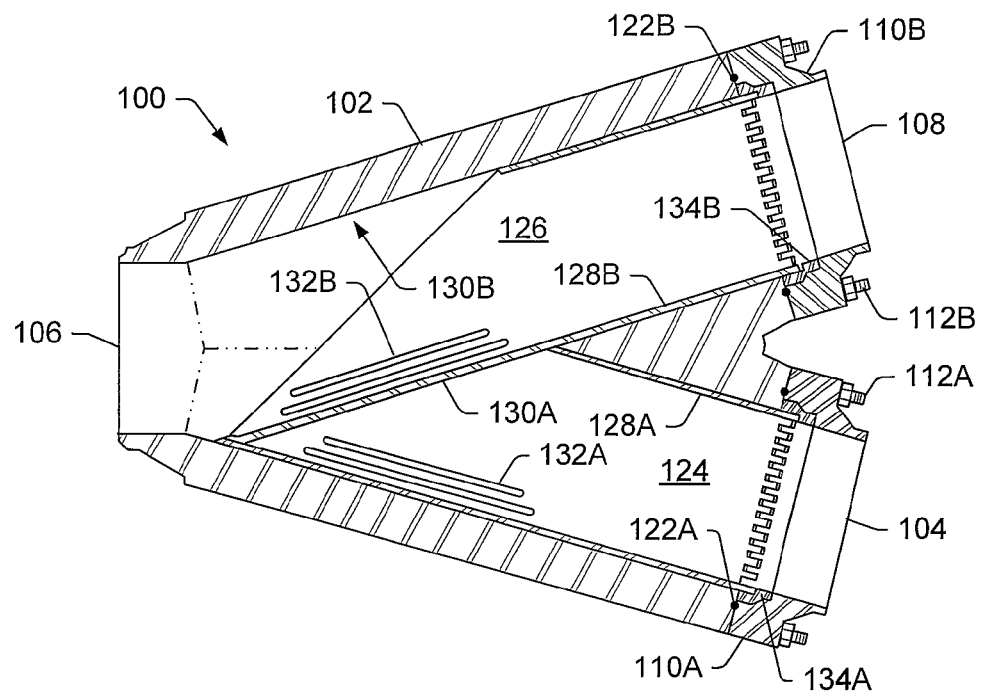
FIG. 9 depicts a cross-sectional representation of an embodiment of a subsea fitting with two diverters with one diverter in the closed position.

In some embodiments, passage 124 and/or passage 126 include one or more bends or other non-conformities as they pass through body 102. In some embodiments, passage 124 and passage 126 are symmetrical about a central axis (e.g., in a "Y"-shape about the central axis, as shown in FIG. 9). In certain embodiments, fitting 100 is designed so that fluid, slurry, or solids (e.g., oil) flow (e.g., oil flow) is through passage 124 from port 104 towards port 106 (in a right to left direction in FIGS. 3 and 4). Thus, a pig may enter fitting 100 through passage 126 via port 108 and be used to pig the pipeline in a reverse direction (e.g., a direction reverse to a combining flow direction in the pipeline). Pigging in the reverse direction of normal combining flow allows the pig to be launched into and retrieved from the pipeline at locations more convenient for the pipeline operator. Pigging in the reverse direction also may allow certain pigging operations to be performed where they would otherwise be more difficult or more costly. Passage 126 and passage 124 are designed and oriented so that any standard pig (e.g., a cup or disc type pig, a smart pig, or an inspection pig) is usable with fitting 100.

As described above, flange 110 may be coupled to body 102 using bolts 112. In some embodiments, bolts 112 are threaded bolts attached to body 102 (e.g., the bolts are welded to the body, formed as part of the body, or threaded into threaded openings in the body). Nuts or other fasteners may be used to secure flange 110 to body 102 using bolts 112. In certain embodiments, seal 122 is provided between flange 110 and body 102. Seal 122 may be, for example, a gasket or o-ring that when pressed between the face of body 102 and the face of flange 110 creates a seal between the faces. Seal 122 inhibits fluid (e.g., seawater or ambient fluids) from entering passage 124 between the faces of body 102 and flange 110 and inhibits fluid (e.g., pipeline fluid) from leaking out of passage 124 into the surrounding environment. In some embodiments, flange 110 is coupled to body 102 by welding the flange to the body. Welding the flange to the body allows the flange to be attached to the body without bolts and without a seal.

In certain embodiments, flange 110 includes and/or is coupled to diverter 128. Diverter 128 is a conduit (e.g., a sleeve or tubular) located inside passage 124 and/or passage 126. In certain embodiments, as shown in FIGS. 3 and 4, diverter 128 is within passage 124 and has a clearance between the diverter's outside face and the passage's inside face that allows the diverter to move (e.g., rotate) inside the passage (e.g., the diverter is a tubular that fits snugly inside the passage (or has a non-interference fit inside the passage) and is allowed to rotate inside the passage).

In certain embodiments, diverter 128 includes opening 130. Opening 130 is an opening sized to allow fluid and/or objects (e.g., pigs) to pass through diverter 128 between passage 124 and passage 126. In certain embodiments, opening 130 is an elliptical or scarf-shaped cut in diverter 128. The cut may substantially match the shape of the junction of passage 124 with passage 126 when opening 130 is aligned with the junction. In some embodiments, opening 130 has other shapes and/or sizes that match the size and/or shape of a junction between passages in fitting 100.

Diverter 128 may move (e.g., rotate) to locate opening 130 in or out of position to allow fluid and/or objects to pass between passage 124 and passage 126. FIG. 3 depicts diverter 128 in an "open" position. In the open position, opening 130 is in a position that allows fluids and/or objects to pass between passage 124 and passage 126 (e.g., the passages are in fluid communication or there is "open flow" between the passages). FIG. 4 depicts diverter 128 in a "closed" position. In the closed position, opening 130 is in a position that inhibits fluids and/or objects from passing between passage 124 and passage 126.

In certain embodiments, diverter 128 includes one or more orifices 132. Orifices 132 may be small openings such as, but not limited to, slots, slits, holes, or other perforations. Orifices 132 may be located on an opposite side of diverter 128 from opening 130 (e.g., diametrically opposed to opening 130). In some embodiments, diverter 128 includes orifices 132 substantially over its entire surface to allow for fluid passage at all orientations of diverter 128. Orifices 132 are located on diverter 128 so that when the diverter is in the closed position, the orifices are positioned to allow at least some fluid to flow between passage 124 and passage 126. Allowing at least some fluid flow between the passages in the closed position may inhibit pressure differential buildup between the passages (e.g., substantially equalize the pressure between the passages). Allowing the flow between passages inhibits lateral thrust loads on diverter 128 that may be caused by differential pressures between the passages. Thrust loads may apply force to diverter 128 in its associated passage, which hinders rotation of the diverter. In certain embodiments, orifices 132 are distributed on diverter 128 so that thrust loads are minimized as the diverter begins to rotate. Orifices 132 may be sized to inhibit passage of certain objects (e.g., pigs) through the orifices and between passage 124 and passage 126 while allowing fluid to flow between the passages.

Diverter 128 may be moved (e.g., rotated) using a drive mechanism. The drive mechanism may include drive hub 134. Drive hub 134 may be located inside body 102 and coupled to, and/or contained by, flange 110. In certain embodiments, drive hub 134 includes teeth 136 that engage with teeth 138 on diverter 128. Teeth 136 may be formed as part of drive hub 134 or attached to drive hub 134 as a separate component (e.g., a ring gear that is attached to the drive hub by, for example, bolting, welding, or other attachment means). In some embodiments, teeth 136 and/or teeth 138 are castellations. When drive hub 134 is operated, teeth 136 engage with teeth 138 to move (e.g., rotate) diverter 128 between the open and closed positions. In certain embodiments, diverter 128 continuously rotates in one direction (e.g., either a clockwise or counterclockwise direction) to move between the open and closed positions. For example, diverter 128 may rotate clockwise to move from the open to the closed position. Rotating diverter 128 further clockwise moves the diverter from the closed position back to the open position. In some embodiments, diverter 128 is rotated in either direction to move between the open and closed positions (e.g., the diverter is rotated clockwise to open the diverter and counterclockwise to close the diverter). In certain embodiments, one or more physical "hard" stops or limits are included in fitting 100. The stops may be included to ensure that diverter 128 resides in a preferred position when it reaches the stops. For example, fitting 100 may include stops at the fully-open position and at the fully-closed position or at one or more locations in between the fully-open position and the fully-closed position.

Figure 5:
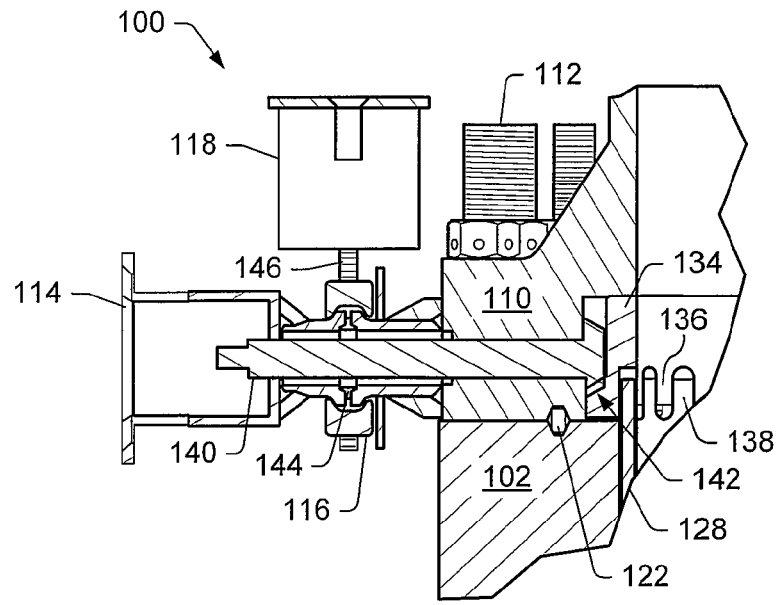
FIG. 5 depicts a cross-sectional representation of a portion of the fitting depicted in FIGS. 1 and 2 with the bucket installed.
Figure 6:
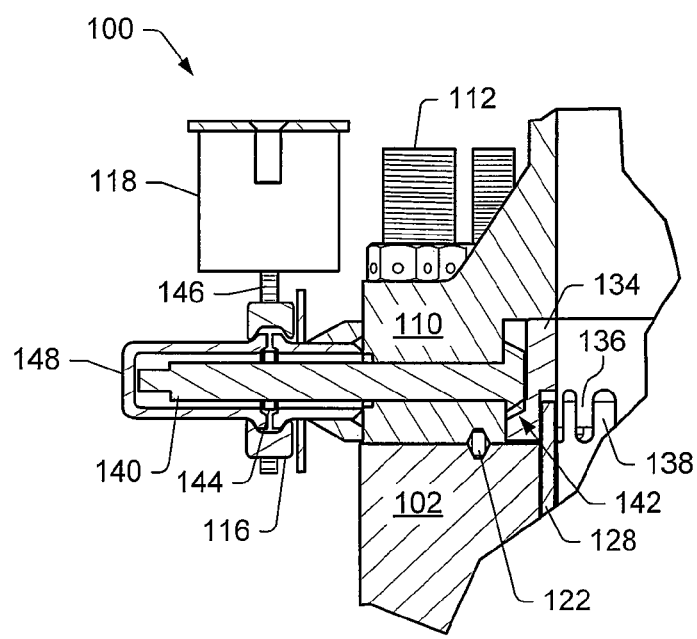
FIG. 6 depicts a cross-sectional representation of a portion of the fitting depicted in FIGS. 1 and 2 with the bucket removed and a blind hub installed on the operating mechanism.

In certain embodiments, drive hub 134 is coupled to a drive operator or gear that controls the operation (e.g., the rotation and orientation) of diverter 128. FIGS. 5 and 6 depict cross-sectional representations of fitting 100 substantially along line B-B shown in FIG. 2. FIG. 5 depicts gear 140 coupled to drive hub 134. In certain embodiments, gear 140 is a pinion gear. In certain embodiments, gear 140 includes a gear and a shaft coupled to the gear.

Figure 7:
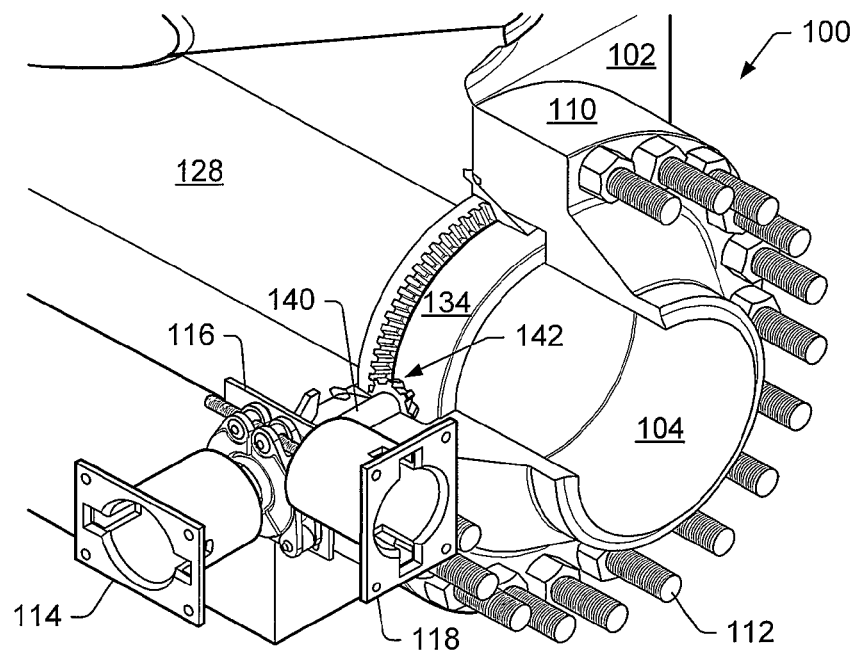
FIG. 7 depicts a perspective view of a section of the subsea fitting with a portion of the fitting sectioned to show the teeth on a gear engaging the teeth on a drive hub.

Teeth on gear 140 may engage with teeth on drive hub 134 at point 142. In some embodiments, gear 140 and/or drive hub 134 interact via belts, chains, castellations, or other mechanisms. FIG. 7 depicts a perspective view of fitting 100 with a portion of the fitting sectioned to show the teeth on gear 140 engaging the teeth on drive hub 134. In certain embodiments, the teeth of drive hub 134 are an integral element of the drive hub. In some embodiments, the teeth of drive hub 134 are a separate component, such as a ring gear, which may be attached to the drive mechanism by, for example, bolting, welding, or other attachment means. In certain embodiments, the teeth on gear 140 and the teeth on drive hub 134 are beveled. The beveled teeth may efficiently couple operation of gear 140 to operation of drive hub 134, but other gear tooth profiles such as spiral and worm gears may be used. Gear 140 may be operated (e.g., rotated) to activate (e.g., rotate) drive hub 134. As described above, operation of drive hub 134 moves (e.g., rotates) diverter 128. In certain embodiments, drive hub 134 is integrated with diverter 128.

In certain embodiments, gear 140 is able to operate under pressure conditions (e.g., under subsea pressure conditions or pressurized fluid conditions in the fitting). Gear 140 may pass through one or more seals (e.g., seal 144 shown in FIGS. 5 and 6). As shown in FIGS. 5 and 6, seal 144 may be located inside connector 116. Seal 144 may be, for example, a dynamic and/or bidirectional seal such as a lip seal, o-ring, or other pressure-energized or enhanced seal. Seal 144 allows gear 140 to operate under subsea and/or pipeline pressure conditions by pressure isolating the internal operation of the gear (e.g., the coupling between the gear and drive hub 134) from the ambient environment. In certain embodiments, seal 144 allows gear 140 to operate at water depths of 10,000 feet or more.

Figure 8:
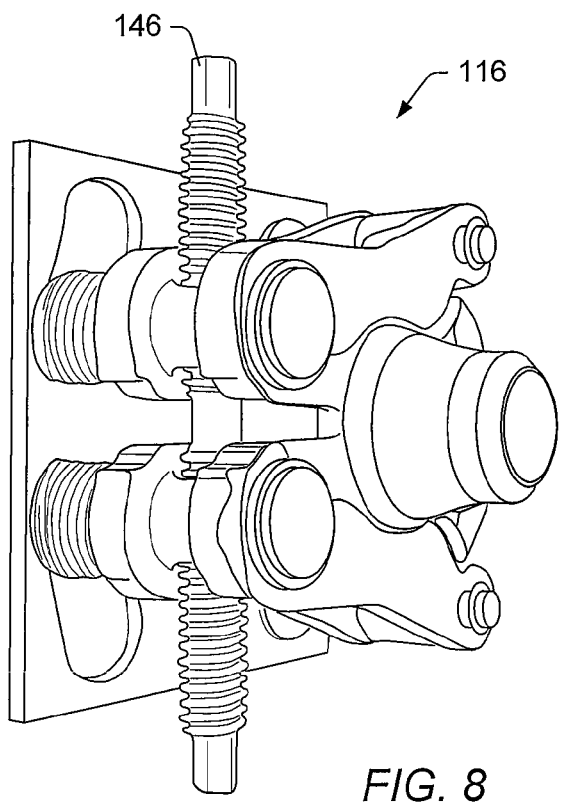
FIG. 8 depicts a perspective view of an embodiment of a connector.

FIG. 8 depicts a perspective view of an embodiment of connector 116. It is to be understood that the connector embodiment depicted in FIG. 8 is merely an example of one embodiment of a connector that may be used in fitting 100 and that there are alternative embodiments of connectors known in the art that may be used to serve the same function and/or purpose. In certain embodiments, connector 116 is a clamp type connector. The base of connector 116 may be attached (e.g., bolted, brazed, or welded) to flange 110, as shown in FIGS. 5 and 6. Operation of the clamp portion of connector 116 may be controlled using connector screw 146, shown in FIGS. 5, 6, and 8. Connector screw 146 may be operated (e.g., rotated clockwise or counterclockwise) to either open or close the clamp of connector 116. In certain embodiments, connector screw 146 is operated to close the clamp and close seal 144 around the shaft of gear 140, as shown in FIGS. 5 and 6. In certain embodiments, connector screw 146 and/or gear 140 are operable using a remotely operated vehicle (an ROV).

In certain embodiments, bucket 118 is coupled to connector screw 146. Bucket 118 may be, for example, a torque bucket or other device that allows connector screw 146 to be more easily operated (e.g., the bucket allows more torque to be applied to the connector screw to rotate the screw). Bucket 118 may also act as a guide or "dock" for a robot arm (e.g., an arm of an ROV) to engage connector screw 146. For example, bucket 118 may be an industry standard torque bucket designed per API (American Petroleum Institute) 17D specifications.

In certain embodiments, bucket 114 is coupled to connector 116, as shown in FIGS. 5 and 7. Bucket 114 may be, for example, a torque bucket or other device that allows gear 140 to be operated (e.g., the bucket allows more torque to be applied to the gear to rotate the gear). Bucket 114 may also act as a guide or dock for a robot arm (e.g., an arm of an ROV) to engage gear 140. For example, bucket 114 may be an industry standard torque bucket designed per API (American Petroleum Institute) 17D specifications.

In some embodiments, connector 116 and/or connector screw 146 are operated using other types of operators. In some embodiments, the connector and/or the connector screw are operated using operators such as, but not limited to, a handle, a wheel, or a wrench-operated device. Such operators as the handles wheel, or wrench-operated device may be operable in shallow water applications of fitting 100 where manual operation of the fitting is possible.

In some embodiments, bucket 114 is removed (e.g., uncoupled) from connector 116. For example, bucket 114 may be removed from connector 116 and replaced with blind hub 148, as shown in FIG. 6. Blind hub 148 may be coupled to connector 116 to cover the outer engagement portion of gear 140. In certain embodiments, blind hub 148 is used to provide a metal-sealed closure over gear 140 to inhibit leaks in the gear system. Providing a metal-sealed closure over gear 140 increases long-term reliability of fitting 100 against leaks by providing a metal backup seal against leaks due to deterioration of any internal seals, such as elastomeric or polymeric seals. In some embodiments, blind hub 148 is used to inhibit activation of gear 140 and/or inhibit damage to the gear. For example, blind hub 148 may be used to protect gear 140 from being accidentally hit and damaged.

In certain embodiments, fitting 100 includes two diverters. For example, one diverter may be located in each of the passages inside fitting 100. FIG. 9 depicts a cross-sectional representation of an embodiment of fitting 100 with two diverters 128A and 128B. In the embodiment depicted in FIG. 9, fitting 100 is a symmetrical fitting (e.g., passages 124 and 126 are symmetrical about a central axis). However, two diverters may be used in fittings that are not symmetrical (e.g., fitting 100 depicted in FIGS. 1-4).

In the embodiment depicted in FIG. 9, diverter 128A is located in passage 124 and diverter 128B is located in passage 126. Each of the diverters has its own associated operating mechanisms. For example, diverter 128A is coupled to flange 110A and drive hub 134A while diverter 128B is coupled to flange 10B and drive hub 134B. Flange 110A may be coupled to body 102 using bolts 112A and seal 122A. Flange 110B may be coupled to body 102 using bolts 112B and seal 122B.

Diverters 128A and 128B include openings 130A and 130B, respectively. Openings 130A and 130B may be shaped to substantially match the shape of the junction between passages 124 and 126 when diverters 128A and 128B are in the open positions. Diverters 128A and 128B may also include orifices 132A and 132B, respectively. FIG. 9 depicts an embodiment of fitting 100 with diverter 128A in the open position (opening 130A is open to passage 126) and diverter 128B in the closed position (opening 130B is closed off to passage 124). In such an embodiment, passage 126 is open to flow and may be cleaned in either direction (e.g., passage 126 is open for pigging). In an alternative arrangement, diverter 128A is in the closed position and diverter 128B is in the open position so that passage 124 is open to flow and may be pigged in either direction.

Figure 10:
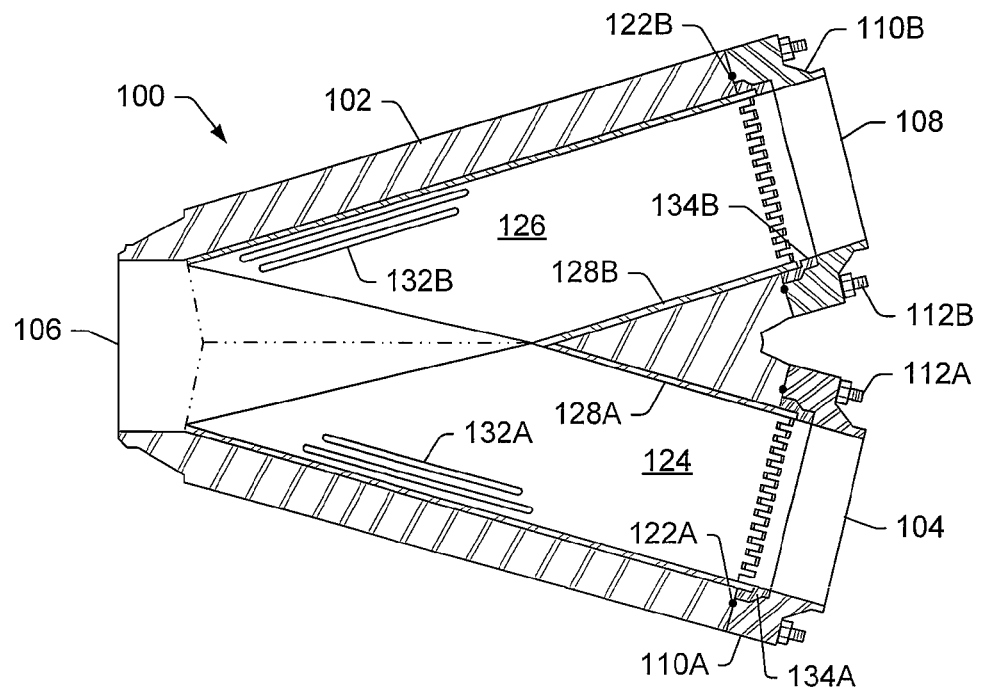
FIG. 10 depicts a cross-sectional representation of an embodiment of a subsea fitting with two diverters with both diverters in the open position.

FIG. 10 depicts a cross-sectional representation of an embodiment of fitting 100 with two diverters 128A and 128B with both diverters in the open position. In such an arrangement, passages 124 and 126 are both open for flow simultaneously. In addition, one or both of the passages may be pigged in the combining flow direction when both diverters are in the open position. In another arrangement, one of diverters 128A or 128B may be closed to direct objects larger than the diverter orifices through the fitting in a specific passage.

In certain embodiments, a tie-back system includes fitting 100. The tie-back system may be located at or proximate to a well (e.g., a subsea well or subsurface well such as a production well). The tie-back system allows the pipeline to be pigged without the use of a second return pipeline upstream of the tie-back system (e.g., to an upstream platform). The tie-back system may include additional piping or conduit that allows the pig to be manipulated and turned around in the pipeline without the use of the second return pipeline. Thus, the pig may be able to go on a round trip through the pipeline (e.g., round-trip-pigging). In certain embodiments, the tie-back system includes, or is coupled to, a kicker line that allows the pig to be pressure manipulated through the tie-back system and returned through pipeline 204 in a reverse direction from the initial pig direction.

Figure 11:
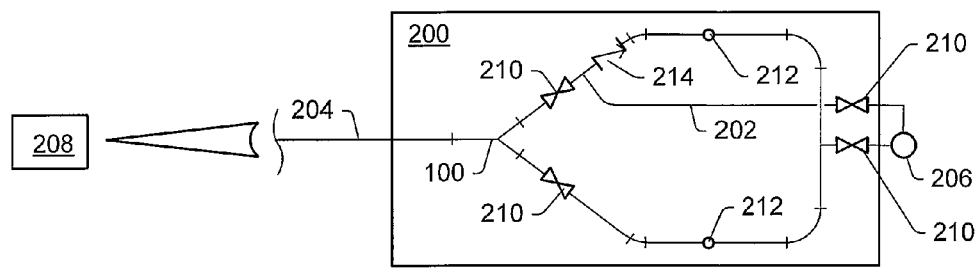
FIG. 11 depicts an embodiment of a tie-back system with pigging capability and a well energized kicker line.

FIG. 11 depicts an embodiment of tie-back system 200 with pigging capability and well energized kicker line 202. Tie-back system 200 may be coupled to, or located in, pipeline 204 at or near well 206. In some embodiments, tie-back system 200 is coupled to, or located in, pipeline 204 at other locations along the pipeline. In certain embodiments, tie-back system 200 includes sections of piping or conduit coupled to pipeline 204 and well 206. In certain embodiments, fluid in tie-back system 200 flows through pipeline 204 from well 206 to upstream 208. Upstream 208 may include facilities, other piping, or other conduits that are upstream of well 206. For example, floating platforms, fixed platforms, template structure platforms, offshore oil rigs, oil drilling ships, onshore platforms or facilities, intermediate processors, final processors, distribution facilities, production vessels, plants, or refineries may be located upstream of well 206. Well 206 may include, but not be limited to, production wells (e.g., oil production wells, slurry production wells, and solid production wells such as subsea production wells or subsurface production wells) and fluid injection wells (e.g., subsea injection wells or subsurface injection wells).

In certain embodiments, a user may send a pig through pipeline 204 using, for example, a pig launcher/receiver. For example, the pig may be launched from upstream 208 through the pig launcher/receiver. Pig launchers/receivers are used to launch and/or receive pigs used in pipeline 204. Pigs may be used, for example, to clear debris inside pipeline. In some embodiments, pig launchers/receivers are located on or coupled to a platform (e.g., a platform located upstream 208). In some embodiments, pig launchers/receivers are subsea pig launchers/receivers. Subsea pig launchers/receivers may be coupled to pipe runs and/or other piping, conduits, and fittings used to operate the pig.

The pig may be propelled to well 206 or to the proximity of the well to clear debris in pipeline 204 and/or tie-back system 200. The pig may then be returned through pipeline 204 using pressure manipulation of the pig in the pipeline and tie-back system 200. In certain embodiments, the sections of piping in tie-back system 200 form a loop so that the pig moves through the loop to reverse the direction of the pig in pipeline 204 and the pig is returned through the pipeline in the reverse direction from the initial pig direction.

In certain embodiments, tie-back system 200 includes one or more fittings 100. Fitting 100 may be coupled to pipeline 204 at or near a junction of the pipeline and tie-back system 200. In certain embodiments, fitting 100 couples pipeline 204 to tie-back system 200. Fitting 100 allows the pig to enter tie-back system 200 from pipeline 204 and exit the tie-back system back into pipeline 204 going in the opposite direction to the direction that the pig entered the tie-back system.

In certain embodiments, tie-back system 200 includes one or more valves 210 and/or one or more pig monitoring devices 212. Valves 210 may be used on one or more of the portions of piping on either side of fitting 100. Valves 210 may be used to close off or isolate one or more sections of tie-back system 200 and/or isolate the tie-back system from pipeline 204. For example, valves 210 may be used to shut off tie-back system 200 or sections of piping in the tie-back system. In certain embodiments, valves 210 are valves such as, but not limited to, ball valves and gate valves. In some embodiments, valves 210 are operable using an ROV, an AUV (autonomous underwater vehicle), remote operation, a human operator, or a human operator in an atmospheric suit. In certain embodiments, tie-back system 200 includes at least one check valve 214. Check valve 214 may limit the flow of fluid (and thus, the pig) to one direction through tie-back system 200.

Pig monitoring devices 212 may include, but not be limited to, pig sigs. Examples of pig sigs include PIG-SIG® IV and PIG-SIG® NI available from T.D. Williamson, Inc. (Tulsa, Okla., U.S.A.). Pig monitoring device 212 may be used to monitor the passage of the pig by the location of the device. Pig monitoring devices 212 may provide other information such as, but not limited to, pig velocity and pig passage time and date.

In certain embodiments, tie-back system 200 includes kicker line 202. Kicker line 202 may be a manifold of pipes and/or valves. Kicker line 202 may provide fluid pressure to push and/or propel the pig along the pipeline. In some embodiments, kicker line 202 provides fluid pressure to propel the pig past well 206 in tie-back system 200. In some embodiments, as shown in FIG. 11, kicker line 202 is energized by fluids from well 206. Valves 210 coupled to kicker line 202 may be used to operate and control the pressure through the kicker line.

Figure 12:
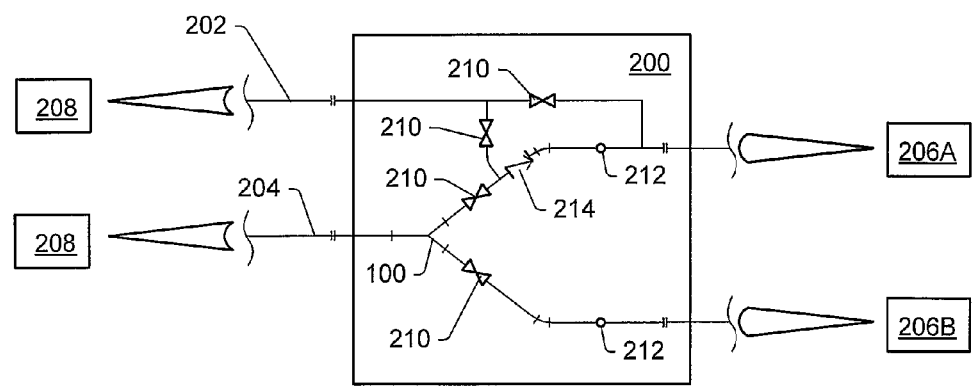
FIG. 12 depicts an embodiment of a tie-back system with pigging capability and a platform energized kicker line.

In some embodiments, kicker line 202 is energized by fluids provided from another source (e.g., an upstream source such as a host platform). FIG. 12 depicts an embodiment of tie-back system 200 with pigging capability and upstream energized kicker line 202. Upstream 208 may provide fluids to kicker line 202. In some embodiments, kicker line 202 is energized with fluids from downstream or lateral of the kicker line. Kicker: line 202 may be used to propel the pig along tie-back system 200 towards well 206A. Well 206A may be coupled to well 206B with piping or conduit. In some embodiments, well 206A and well 206B are one well coupled to tie-back system 200.

In some embodiments, upstream 208 provides fluid and pressure to push the pig through two or more tie-back systems (e.g., the upstream services two or more tie-back systems). For example, upstream 208 may provide fluid to more than one kicker line 202 with each kicker line being coupled to one tie-back system. Thus, a single riser on a host platform upstream 208 could be used to provide fluid to several kicker lines. Using the single riser instead of several different risers may lessen the dynamic load on the host platform. The riser for the kicker lines is typically smaller than risers used for pipeline 204. Thus, using the kicker lines to propel the pig through the tie-back systems may reduce the load on the host platform or other upstream service source.

Coupling one or more tie-back systems 200 to kicker line 202 allows the kicker line, pipeline 204, and/or other piping or conduits to be installed and/or moved into a final position before host services are installed and coupled to piping or conduits. In certain embodiments, tie-back system 200 includes at least one termination point for a well control or valve control umbilical. Terminating the well control umbilical in tie-back system 200 allows the well control umbilical to be used to control valves 210 and/or fitting 100 in the tie-back system. In addition, having the termination point in tie-back system 200 allows an umbilical from tie-back system 200 to well 206 to be installed and/or moved into final position before host services are installed.

Figure 13:
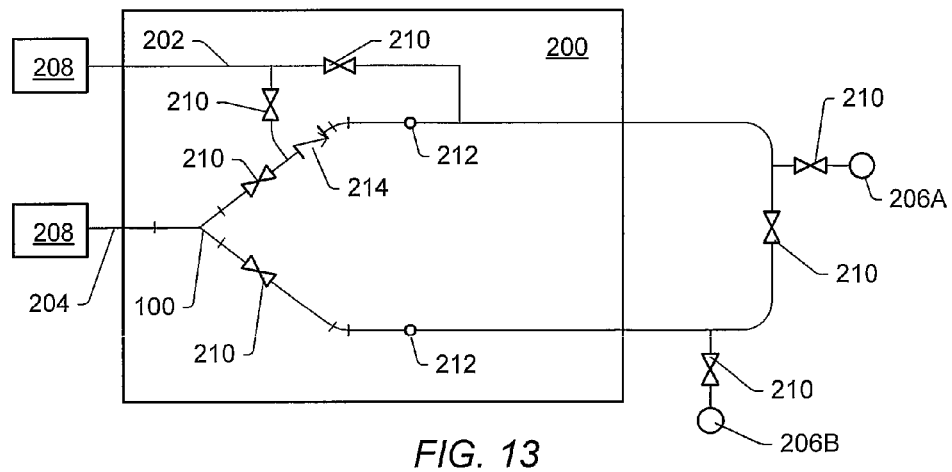
FIG. 13 depicts an embodiment of a tie-back system with pigging capability and a small diameter kicker line.

In some embodiments, kicker line 202 is a small diameter injection pipeline. FIG. 13 depicts an embodiment of tie-back system 200 with pigging capability and small diameter kicker line 202. In some embodiments, small diameter kicker line 202 may be used to provide injection fluid to well 206A or 206B if either of these wells is an injection well or requires injection.

Figure 14:
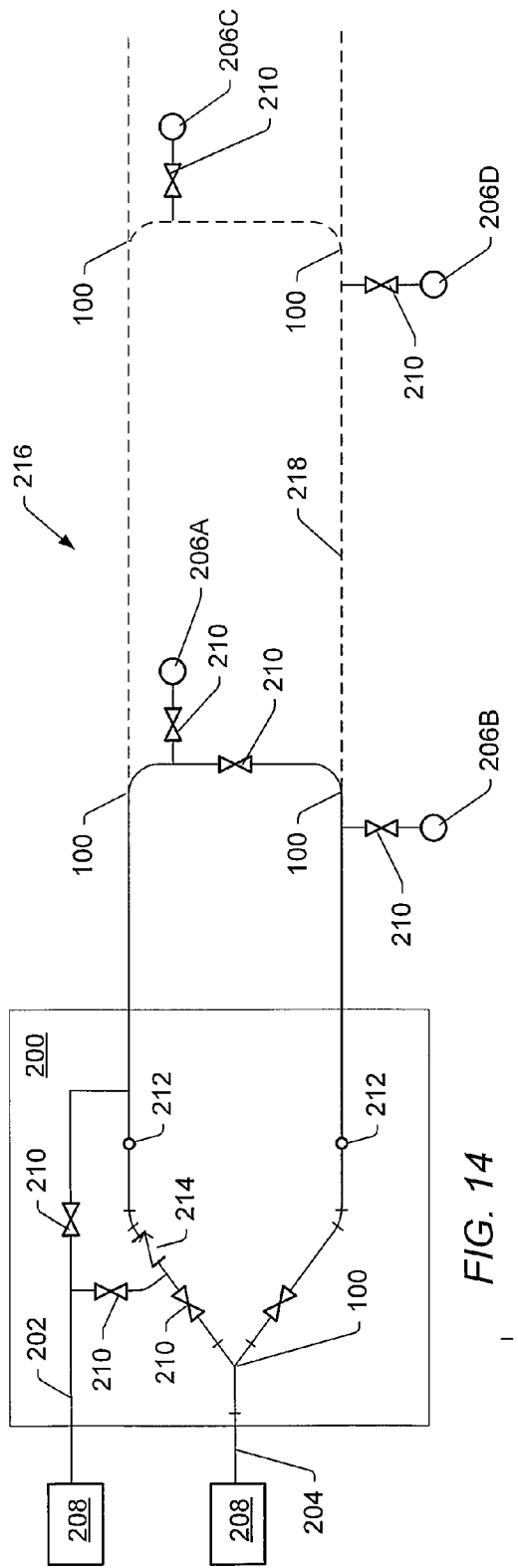
FIG. 14 depicts an embodiment of a tie-back system with pigging capability, a kicker line, and future pipeline system development.

In some embodiments, the pipeline system includes future development added at later times. Use of tie-back system 200 with fitting 100 and kicker line 202 allows for future pipeline system development. FIG. 14 depicts an embodiment of tie-back system 200 with pigging capability, kicker line 202, and future pipeline system development 216. Future pipeline system development 216 may include piping 218, wells 206C, 206D, valves 210, and other needed components or devices. In some embodiments, kicker line 202 is a small diameter kicker line. In some embodiments, kicker line 202 originates from a well (e.g., well 206B). Future pipeline system development 216 may be added at later times, for example, as the size of the field development increases. In some embodiments, one or more tie-back systems 200 are added as part of future pipeline system development 216.

Figure 15:
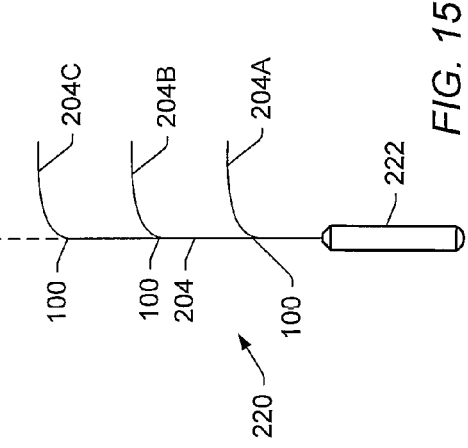
FIG. 15 depicts an embodiment of a pipeline system for using a single pig launcher/receiver with multiple pipeline branches.

FIG. 15 depicts an embodiment of pipeline system 220 for using single pig launcher/receiver 222 with multiple pipeline branches 204A, 204B, 204C. Three pipeline branches are shown in the embodiment depicted in FIG. 15. It is to be understood, however, that any number of pipeline branches may be used as desired or needed. At least one fitting 100 is located at the junctions of branch 204A, branch 204B, and/or branch 204C with pipeline 204. The pig may be launched using pig launcher/receiver 222 and then directed into a desired branch (either branch 204A, branch 204B, or branch 204C) using one of fittings 100. In some embodiments, pig launcher/receiver 222 is used to receive the pig from one of the branches. Using fittings 100 at the junctions of pipeline 204 and branches 204A, 204B, 204C allows one pig launcher/receiver 222 to be used for the branches in pipeline system 220. Using one pig launcher/receiver 222 may reduce the load on a host platform and/or reduces costs associated with installation, use, space required, and/or maintenance of the pig launcher/receiver in any location.

Figure 16:
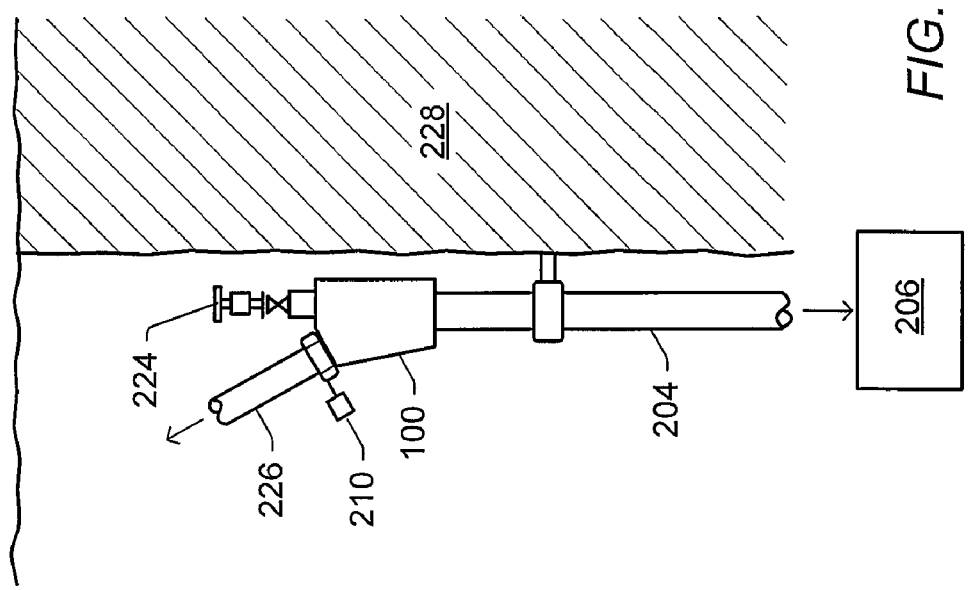
FIG. 16 depicts an embodiment for using a subsea fitting for coiled tubing access.

FIG. 16 depicts an embodiment for using fitting 100 for coiled tubing access. Pipeline 204 may be coupled to fitting 100. Fitting 100 is coupled to coiled tubing insertion apparatus 224 and pipeline 226. Pipeline 204 may be coupled to host platform 228. In some embodiments, pipeline 204 is coupled to another facility or another pipeline. Fitting 100 allows fluid to be produced from well 206 while also allowing access to pipeline 204 for coiled tubing insertion by apparatus 224 or for allowing access for other apparatus.

It is to be understood the invention is not limited to particular systems described which may, of course, vary. It is also to be understood that the terminology used herein is for the purpose of describing particular embodiments only, and is not intended to be limiting. As used in this specification, the singular forms "a", "an" and "the" include plural referents unless the content clearly indicates otherwise. Thus, for example, reference to "a bolt" includes a combination of two or more bolts and reference to "a fluid" includes mixtures of fluids.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A piggable pipeline system, comprising:
a pipeline;
one or more pig launcher/receivers coupled to the pipeline;
at least one fitting coupled to the pipeline, the fitting comprising:
a body;
at least two passages through the body, wherein the passages are in fluid communication within the body;
a tubular diverter located lengthwise in one of the passages, wherein the tubular diverter fits snugly inside the passage such that fluid flows longitudinally from one end of the passage to the other end of the passage through the inside of the tubular diverter, wherein the tubular diverter rotates within the passage in which the tubular diverter is located during use, and wherein the tubular diverter comprises an opening in a portion of its wall.

wherein the tubular diverter is rotated in the passage during use such that, when the opening in the wall of the tubular diverter at least partially aligns with at least one other passage, there is open flow between the at least one other passage and the inside of the tubular diverter, and, when the opening in the wall of the tubular diverter is not aligned with at least one other passage, flow is inhibited between the at least one other passage and the inside of the tubular diverter; and wherein the pipeline is configured to allow a pig to be launched from at least one of the pig launcher/receivers and returned through the pipeline to at least one of the pig launcher/receivers.

2. The system of claim 1, wherein the system is configured to allow the pig to be launched into the pipeline and received from the pipeline without a return pipeline being coupled to the pipeline.

3. The system of claim 1, further comprising a host platform coupled to the pipeline.

4. The system of claim 3, wherein the pig launcher/receiver is coupled to the host platform.

5. The system of claim 3, wherein the system is configured to allow the pig to be launched into the pipeline from the upstream of the system and received from the pipeline without an additional pipeline being coupled to the system.

6. The system of claim 1, further comprising at least one tie-back system coupled to the pipeline, wherein the tie-back system is configured to reverse the direction of travel of the pig through the pipeline.

7. The system of claim 6, wherein the tie-back system is coupled to the pipeline at or proximate to a subsea well.

8. The system of claim 6, further comprising at least one kicker line coupled to the tie-back system, wherein the kicker line is configured to provide fluid to push the pig along the tie-back system.

9. The system of claim 8, wherein the kicker line is configured to be provided fluid from the system.

10. The system of claim 8, wherein the kicker line is configured to provide fluid to the system.

11. The system of claim 1, wherein the fitting is operable using a remotely operated vehicle (ROV), an autonomous underwater vehicle (AUV), or human operator.

12. The system of claim 1, wherein the fitting is a subsea fitting.

13. The system of claim 1, wherein the system is a subsea system.

14. A piggable pipeline system, comprising:
a pipeline;
a pig launcher/receiver coupled to the pipeline;
at least two fittings coupled to the pipeline, the fittings comprising:
 a body;
 at least two passages through the body, wherein the passages are in fluid communication within the body;
 a tubular diverter located lengthwise in one of the passages, wherein the tubular diverter fits snugly inside the passage such that fluid flows longitudinally from one end of the passage to the other end of the passage through the inside of the tubular diverter, wherein the tubular diverter rotates within the passage in which the tubular diverter is located during use, and wherein the tubular diverter comprises an opening in a portion of its wall:
 wherein the tubular diverter is rotated in the passage during use such that, when the opening in the wall of the tubular diverter at least partially aligns with at least one other passage, there is open flow between the at least one other passage and the inside of the tubular diverter, and, when the opening in the wall of the tubular diverter is not aligned with at least one other passage, flow is inhibited between the at least one other passage and the inside of the tubular diverter; and two or more pipeline branches coupled to the pipeline, wherein the branches are coupled to the pipeline at the fittings.

15. The system of claim 14, wherein the system is configured to use only one pig launcher/receiver.

16. The system of claim 14, further comprising a facility coupled to the pipeline.

17. The system of claim 16, wherein the pig launcher/receiver is coupled to the host platform.

18. The system of claim 14, further comprising at least one tie-back system coupled to the pipeline, wherein the tie-back system is configured to reverse the direction of travel of a pig through the pipeline.

19. The system of claim 18, wherein the tie-back system is coupled to the pipeline at or proximate to a subsea well.

20. The system of claim 14, wherein the fitting is operable using a remotely operated vehicle (ROV), an autonomous underwater vehicle (AUV), or human operator.

21. The system of claim 14, wherein the fitting is a subsea fitting.

22. The system of claim 14, wherein the system is a subsea system.

23. A piggable subsea pipeline system, comprising:
a pipeline;
at least one subsea fitting coupled to the pipeline, the fitting comprising:
 a body;
 at least two passages through the body, wherein the passages are in fluid communication within the body;
 a tubular diverter located lengthwise in one of the passages, wherein the tubular diverter fits snugly inside the passage such that fluid flows longitudinally from one end of the passage to the other end of the passage through the inside of the tubular diverter, wherein the tubular diverter rotates within the passage in which the tubular diverter is located during use, and wherein the tubular diverter comprises an opening in a portion of its wall:
 wherein the tubular diverter is rotated in the passage during use such that, when the opening in the wall of the tubular diverter at least partially aligns with at least one other passage, there is open flow between the at least one other passage and the inside of the tubular diverter, and, when the opening in the wall of the tubular diverter is not aligned with at least one other passage, flow is inhibited between the at least one other passage and the inside of the tubular diverter; and
a coiled tubing insertion apparatus coupled to the fitting;
wherein the fitting allows coiled tubing to be inserted into the pipeline and fluid to be pumped from a subsea well coupled to the pipeline.

* * * * *